US012633247B2

(12) United States Patent
Liu et al.

(10) Patent No.: US 12,633,247 B2
(45) Date of Patent: May 19, 2026

(54) PIXEL CIRCUIT WITH LIGHT-EMITTING CONTROL MODULE, AND DRIVING SYSTEM

(71) Applicant: Wuhan China Star Optoelectronics Semiconductor Display Technology Co., Ltd., Wuhan (CN)

(72) Inventors: Zhao Liu, Wuhan (CN); Long Chen, Wuhan (CN); Liang Sun, Wuhan (CN); Mian Zeng, Wuhan (CN); Zhixian Yuan, Wuhan (CN); Zhe Li, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/918,125

(22) PCT Filed: Jul. 12, 2022

(86) PCT No.: PCT/CN2022/105105
§ 371 (c)(1),
(2) Date: Jan. 27, 2025

(87) PCT Pub. No.: WO2024/000643
PCT Pub. Date: Jan. 4, 2024

(65) Prior Publication Data

US 2025/0157387 A1 May 15, 2025

(30) Foreign Application Priority Data

Jun. 29, 2022 (CN) ......................... 202210762972.9

(51) Int. Cl.
*G09G 3/30* (2006.01)
*G09G 3/32* (2016.01)

(52) U.S. Cl.
CPC ....... *G09G 3/32* (2013.01); *G09G 2310/0243* (2013.01); *G09G 2310/027* (2013.01);
(Continued)

(58) Field of Classification Search
CPC ............. G09G 3/32; G09G 2310/0243; G09G 2310/027; G09G 2310/066;
(Continued)

(56) References Cited

U.S. PATENT DOCUMENTS

2019/0371250 A1* 12/2019 Baek .................... G09G 3/3291
2020/0082768 A1 3/2020 Oh et al.
(Continued)

FOREIGN PATENT DOCUMENTS

CN 107464517 A 12/2017
CN 110211523 A 9/2019
(Continued)

OTHER PUBLICATIONS

International Search Report in International application No. PCT/CN2022/105105, mailed on Dec. 29, 2022.
(Continued)

*Primary Examiner* — Sanghyuk Park
(74) *Attorney, Agent, or Firm* — Menachem Nathan; Nathan & Associates

(57) ABSTRACT

Embodiments of the present disclosure are directed to a pixel circuit and a driving system. The pixel circuit comprises a light-emitting device, a driving module connected to the light-emitting device, and a light-emitting control module. The driving module drives the light-emitting device to emit light. The light-emitting control module is connected to the driving module. The light-emitting control module, the light-emitting device and the driving module are all connected in series between a first power supply signal and a second power supply signal. A control end of the light-
(Continued)

emitting control module receives a light-emitting control signal. The light-emitting control signal includes at least one pulse signal. The light-emitting control module turns off the light-emitting device in response to the pulse signal which is set according to a spectrum of a luminance waveform of a frame period.

19 Claims, 13 Drawing Sheets

(52) U.S. Cl.
CPC ... *G09G 2310/066* (2013.01); *G09G 2310/08* (2013.01); *G09G 2320/0247* (2013.01)

(58) Field of Classification Search
CPC ....... G09G 2310/08; G09G 2320/0247; G09G 3/3208; G09G 3/3291
See application file for complete search history.

(56) References Cited

U.S. PATENT DOCUMENTS

| | | | | |
|---|---|---|---|---|
| 2022/0319409 | A1* | 10/2022 | Park | G09G 3/3266 |
| 2024/0331627 | A1* | 10/2024 | Tanaka | G09G 3/3233 |

FOREIGN PATENT DOCUMENTS

| | | | |
|---|---|---|---|
| CN | 111798801 | A | 10/2020 |
| CN | 111968574 | A | 11/2020 |
| CN | 112735313 | A | 4/2021 |
| CN | 113140180 | A | 7/2021 |
| CN | 113380193 | A | 9/2021 |
| CN | 113436577 | A | 9/2021 |
| CN | 113948032 | A | 1/2022 |
| CN | 114582287 | A | 6/2022 |
| KR | 20200030431 | A | 3/2020 |

OTHER PUBLICATIONS

Written Opinion of the International Search Authority in International application No. PCT/CN2022/105105, mailed on Dec. 29, 2022.

Chinese Office Action issued in corresponding Chinese Patent Application No. 202210762972.9 dated Oct. 10, 2024, pp. 1-8.

* cited by examiner (a)Luminance waveform (original driving)

(b)Frequency-domain amplitude spectrum (original driving)

(c)Frequency-domain phase spectrum (original driving)

(d)Luminance waveform (original driving)

(e)Frequency-domain amplitude spectrum (original driving)

(f)Frequency-domain phase spectrum (original driving)

(g)Luminance waveform (new driving)

(h)Frequency-domain amplitude spectrum (new driving)

(i)Frequency-domain phase spectrum (new driving)

(d)Luminance waveform (original driving)

(e)Frequency-domain amplitude spectrum (original driving)

(f)Frequency-domain phase spectrum (original driving)

PIXEL CIRCUIT WITH LIGHT-EMITTING CONTROL MODULE, AND DRIVING SYSTEM

CROSS REFERENCE OF RELATED APPLICATION

This application is a US national phase application based upon an International Application No. PCT/CN2022/105105, filed on Jul. 12, 2022, which claims the priority of Chinese Patent Application No. 202210762972.9, entitled "PIXEL CIRCUIT AND DRIVING SYSTEM", filed on Jun. 29, 2022, the disclosure of which is incorporated herein by reference in its entirety.

FIELD OF THE DISCLOSURE

The present disclosure relates to a display technology, and more particularly, to a pixel circuit and a driving system.

BACKGROUND

Light-emitting devices such as mini light-emitting diodes, micro light-emitting diodes, and organic light-emitting diodes have the advantages of high luminance, high contrast, and high color gamut and have been widely used in high-performance displays. In the conventional pixel circuit, the leakage phenomenon is relatively serious. In the subsequent light-emitting process of the light-emitting device, due to the leakage current, the gate voltage of the driving transistor will change. This results in a huge variance of the luminance under a low frequency driving in a frame time and also results in flickers and thus the display quality of the display device is greatly impacted.

SUMMARY

Technical Problem

One objective of an embodiment of the present disclosure is to provide a pixel circuit and a driving system, to solve the above-mentioned flicker issue under the low frequency driving in a conventional display.

Solution to Problem

Technical Solution

According to an embodiment of the present disclosure, a pixel circuit is disclosed.

The pixel circuit comprises a light-emitting device, a driving module connected to the light-emitting device, and a light-emitting control module.

The driving module drives the light-emitting device to emit light.

The light-emitting control module is connected to the driving module. The light-emitting control module, the light-emitting device and the driving module are all connected in series between a first power supply signal and a second power supply signal.

A control end of the light-emitting control module receives a light-emitting control signal. The light-emitting control signal includes at least one pulse signal. The light-emitting control module turns off the light-emitting device in response to the pulse signal which is set according to a spectrum of a luminance waveform of a frame period.

Optionally, the light-emitting control signal further comprises a first reference pulse signal and a second reference pulse signal, the first reference pulse signal is located at a beginning of a frame period, and the second reference pulse signal is on at least one time equal diversion point of a frame period. A time interval exists between any two of the pulse signal, the first reference pulse signal and the second reference pulse signal, or the pulse signal and the first reference pulse signal or the second reference pulse signals are partially overlapped.

Optionally, the pixel circuit operates in one of a plurality of driving modes, and a refresh frequency of each driving mode is different, and the light-emitting control signal under each driving mode has a corresponding set of pulse signals.

Optionally, the pixel circuit operates in at least a first driving mode or a second driving mode, a refresh frequency of the first driving mode is less than a refresh frequency of the second driving mode. In one frame period, a number of pulses of the pulse signal in the first driving mode is greater than or equal to a number of pulses of the pulse signal in the second driving mode.

Optionally, in one frame period, when the refresh frequency is 15 Hz, a number of the pulse signals is not less than 5. The refresh frequency is 20 Hz, a number of the pulse signals is not less than 5. When the refresh frequency is 30 Hz, the number of the pulse signals is not less than 1.

Optionally, the pulse signal is set according to a low frequency component in the spectrum of the luminance waveform of the frame period. A frequency of the low frequency component is less than 60 Hz.

Optionally, the frame period includes a first display stage and a second display stage. A display luminance of the first display stage is greater than a display luminance of the second display stage. A distribution density of the pulse signal in the first display stage is greater than distribution density of the pulse signal in the second display stage.

According to another embodiment of the present disclosure, a driving system includes a signal generating module having an output terminal and a pixel circuit. The signal generating module is configured to output the light-emitting control signal. The pixel circuit comprises a light-emitting device, a driving module connected to the light-emitting device, and a light-emitting control module. The driving module drives the light-emitting device to emit light. The light-emitting control module is connected to the driving module. The light-emitting control module, the light-emitting device and the driving module are all connected in series between a first power supply signal and a second power supply signal. A control end of the light-emitting control module receives a light-emitting control signal. The light-emitting control signal includes at least one pulse signal. The light-emitting control module turns off the light-emitting device in response to the pulse signal which is set according to a spectrum of a luminance waveform of a frame period.

Optionally, the signal generating module comprises a storage unit and a pulse signal generating unit. The storage unit is configured to store parameter information of the pulse signal. The pulse signal generating unit is connected to the storage unit, and the pulse signal generation unit is configured to generate the pulse signal according to the parameter information.

Optionally, the parameter information includes a pulse start position control parameter, a pulse step size type control parameter, a pulse start position parameter, and a pulse end position parameter.

Optionally, the pulse signal generating unit comprises a counter, a first judging sub-unit and a second judging sub-unit. The counter is configured to count according to the pulse start position control parameter and the pulse step type control parameter to obtain the first parameter; the first judgment sub-unit compares the first parameter with the pulse start position parameter. When the first parameter is less than the pulse start position parameter, the counter continues to count. When the first parameter is equal to the pulse start position parameter, then a start position of the pulse signal is determined. The second judgment sub-unit compares the first parameter with the pulse end position parameter. When the first parameter is less than the pulse end position parameter, the counter continues to count. When the first parameter is equal to the pulse end position parameter, then the end position of the pulse signal is determined.

Optionally, the storage unit stores a plurality of sets of the parameter information. Each set of the parameter information corresponds to a refresh frequency. The pulse signal generating unit correspondingly obtains the parameter information according to different refresh frequencies.

Optionally, the signal generation module further comprises a start signal generating unit and a GOA circuit. The pulse signal generation unit is arranged in the start signal generation unit. The start signal generating unit is configured to generate a start signal including the pulse signal. The GOA circuit is connected to the start signal generating unit. The GOA circuit is configured to generate multiple stages of the light-emitting control signal according to the start signal including the pulse signal.

Optionally, the driving system further comprises a driving chip, and the start signal generating unit is provided in the driving chip.

Optionally, the signal generating module further comprises a first GOA circuit. The first GOA circuit is connected with the pulse signal generating unit. The first GOA circuit is configured to generate multiple stages of the pulse signal.

Optionally, the pulse signal is set according to a low frequency component in the spectrum of the luminance waveform of the frame period. A frequency of the low frequency component is less than 60 Hz.

Optionally, the light-emitting control signal further comprises a first reference pulse signal and a second reference pulse signal, the first reference pulse signal is located at a beginning of a frame period. The second reference pulse signal is on at least one time equal diversion point of a frame period. A time interval exists between any two of the pulse signal, the first reference pulse signal and the second reference pulse signal, or the pulse signal and the first reference pulse signal or the second reference pulse signals are partially overlapped.

Optionally, the pixel circuit operates in one of a plurality of driving modes, and a refresh frequency of each driving mode is different, and the light-emitting control signal under each driving mode has a corresponding set of pulse signals.

Optionally, the frame period includes a first display stage and a second display stage. A display luminance of the first display stage is greater than a display luminance of the second display stage. A distribution density of the pulse signal in the first display stage is greater than distribution density of the pulse signal in the second display stage.

Beneficial Effect of Invention

Advantageous Effect

The present disclosure provides a pixel circuit and a driving system. The pixel circuit comprises a driving module, a light-emitting control module and a light-emitting device. The driving module, the light-emitting control module and the light-emitting device are connected in series between the first power signal and the second power signal. The control end of the light-emitting control module receives a light-emitting control signal. In an embodiment, at least one pulse signal is added in the light-emitting control signal. Because the light-emitting control module turns off the light-emitting device under the control of the pulse signal, the luminance of the corresponding time period of the pulse signal could be reduced by setting the pulse signal according to the spectrum of the luminance waveform of one frame period. In this way, the luminance of the low-frequency component in the luminance spectrum in one frame period could be reduced and the flicker issue could be alleviated.

BRIEF DESCRIPTION OF THE DRAWINGS

Figure Description

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

Embodiments of Invention

Figure 1:
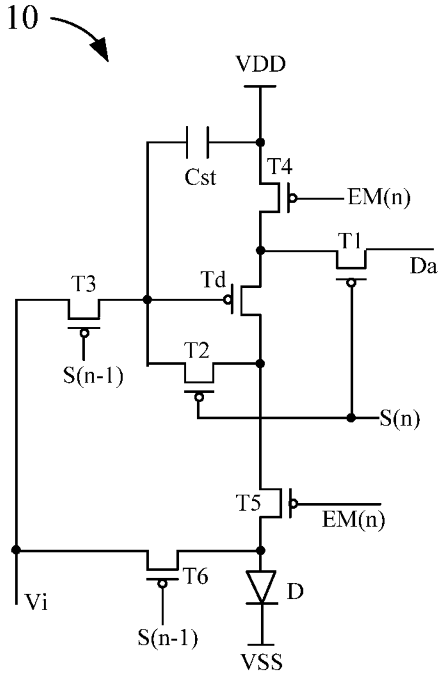
FIG. 1 is a diagram of a pixel circuit according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

The present application provides a driving system, which will be described in detail below. It should be noted that the description order of the following embodiments is not intended to limit the preferred order of the embodiments of the present application.

Figure 2:
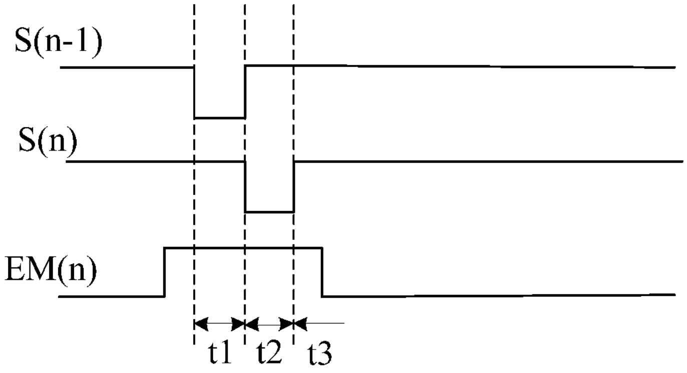
FIG. 2 is a signal timing diagram of the pixel circuit shown in FIG. 1.

Please refer to FIG. 1 and FIG. 2. FIG. 1 is a diagram of a pixel circuit according to an embodiment of the present disclosure. FIG. 2 is a signal timing diagram of the pixel circuit shown in FIG. 1. In one frame period, the driving sequence of the pixel circuit 10 includes a reset phase t1, a data writing and compensation phase t2, and a light-emitting phase t3.

In the reset phase t1, the $(n-1)^{th}$-stage scan signal S(n−1) is at a low voltage level, the third transistor T3 and the sixth transistor T6 are turned on, and the gate of the driving transistor Td and the anode of the light emitting device D are reset to the reset voltage Vi.

At this time, the enable signal EM and the $n^{th}$-stage scan signal S(n) is at a high voltage level, the first transistor T1, the second transistor T2, the fourth transistor T4 and the fifth transistor T5 are all turned off, and the light-emitting device D does not emit light.

In the data writing and compensation stage t2, the $n^{th}$-stage scan signal S(n) is at a low voltage level, the first transistor T1, the second transistor T2 and the driving transistor Td are all turned on, and the data voltage Da passes through the first transistor T1, the driving transistor Td and the second transistor T2 to charge the gate of the driving transistor Td. When the voltage level of the gate of the driving transistor Td rises to Vdata-Vth (Vth is the threshold voltage of the driving transistor Td), the driving transistor Td is cut off, the voltage level of the gate no longer rises, and the threshold voltage is stored in the storage capacitor Cst, thereby realizing the threshold voltage compensation of the driving transistor Td.

At this time, the enable signal EM remains at a high voltage level, the fourth transistor T4 and the fifth transistor T5 are both turned off, and the light-emitting device D does not emit light.

In the light-emitting stage t3, the enable signal EM is changed from a high voltage level to a low voltage level, and the fourth transistor T4 and the fifth transistor T5 are both turned on. At this time, the power supply voltage VDD starts to charge the anode of the light-emitting device D. When the anode is charged to the turn-on voltage of the light-emitting device D, the light-emitting device D starts to emit light.

It can be understood that since both the second transistor T2 and the third transistor T3 are connected to the gate of the driving transistor Td, the leakage current characteristics of these two transistors will directly affect the luminance stability in the light-emitting phase t3. However, the leakage current of the LTPS (Low Temperature Poly-Silicon) transistor often used in the OLED (Organic Light-Emitting Diode) display is relatively large, and the voltage level of the gate will change. This results in a large change in luminance within a frame period under low-frequency driving and thus flickers occur.

Figure 3:
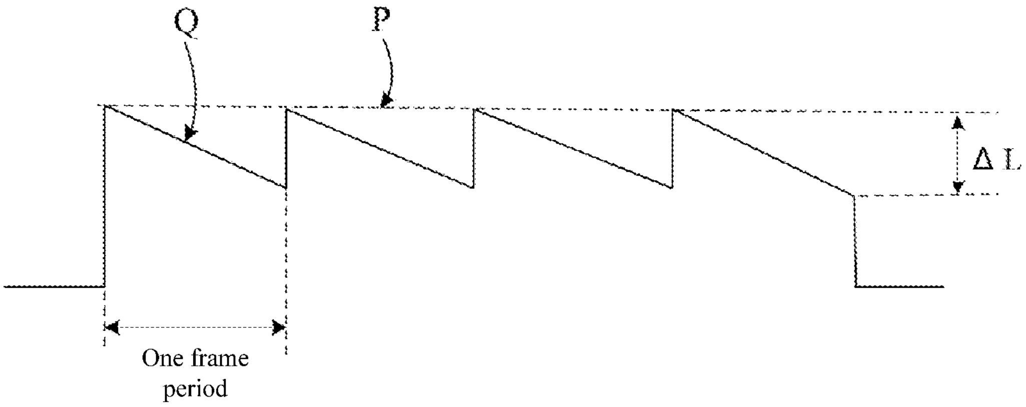
FIG. 3 is a diagram of the luminance change of the display panel in one frame period according to an embodiment of the present disclosure.

Specifically, please refer to FIG. 3. FIG. 3 is a diagram of the luminance change of the display panel in one frame period according to an embodiment of the present disclosure. The dotted line P represents the target luminance of the display panel in one frame period. The curve Q represents the actual luminance variation trend of the display panel in one frame period. It can be seen from FIG. 3 that in one frame period, the luminance variance amount of the display is ΔL, the variance amount is relatively large, and flicker is prone to occur.

Figure 4:
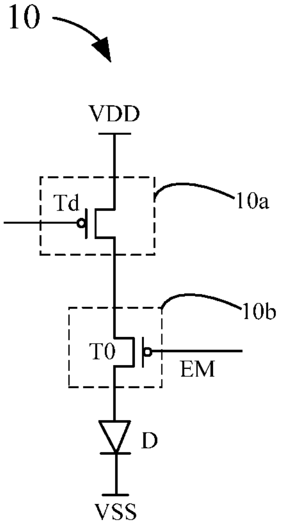
FIG. 4 is a diagram of a pixel circuit according to a first embodiment of the present disclosure.
Figure 5:
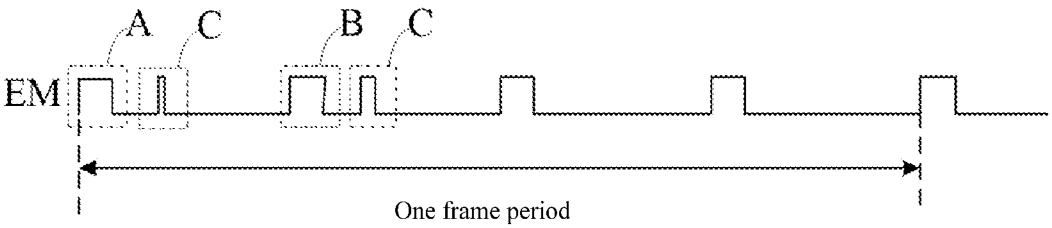
FIG. 5 is a timing diagram of the light-emitting control signal according to an embodiment of the present disclosure.

Please refer to FIG. 4 and FIG. 5. FIG. 4 is a diagram of a pixel circuit according to a first embodiment of the present disclosure. FIG. 5 is a timing diagram of the light-emitting control signal according to an embodiment of the present disclosure. According to an embodiment of the present disclosure, a pixel circuit 10 is disclosed. The pixel circuit 10 includes a driving module 10*a*, a light-emitting control module 10*b*, and a light-emitting device D. The light-emitting control module 10*b*, the light emitting device D and the driving module 10*a* are all connected in series between the first power supply signal VDD and the second power supply signal VSS. The control end of the light-emitting control module 10*b* receives the light-emitting control signal EM.

The driving module 10*a* includes at least a driving transistor Td. The light-emitting control module 10*b* includes at least a light-emitting control transistor T0. The source and drain of the driving transistor Td, the source and drain of the light-emitting control transistor T0 and the light-emitting device D are all connected in series between the first power supply signal VDD and the second power supply signal VSS. The gate of the light-emitting control transistor T0 receives the light-emitting control signal EM. The light-emitting control signal EM includes at least one pulse signal C. The light-emitting control transistor T0 is turned off under the control of the pulse signal C. The pulse signal C is set according to the spectrum of the luminance distribution of one frame period.

The spectrum of the luminance distribution of one frame period refers to: the luminance signal of the display panel is collected in one frame period, and then converted into a digital signal. All digital signals are then Fourier transformed to obtain a set of amplitudes of different frequency signals. Alternatively, the luminance signals of multiple frame periods of the display panel are continuously collected within a period of time, and all the luminance signals are converted into digital signals. All digital signals are then Fourier transformed to obtain a set of amplitudes of different frequency signals. In the following embodiments, the spectrum of the luminance distribution is simply referred to as the luminance spectrum.

The first power supply signal VDD and the second power supply signal VSS are both used for outputting a predetermined voltage value. In addition, in an embodiment of the present disclosure, the voltage level of the first power supply signal VDD is greater than the voltage level of the second power supply signal VSS. Specifically, the voltage level of the second power supply signal VSS may be the ground voltage. Of course, it can be understood that the potential of the second power supply signal VSS can also be another voltage level.

In this embodiment, at least one pulse signal C is added to the light-emitting control signal EM. Since the light-emitting control module 10*b* is turned off under the control of the pulse signal C and the light-emitting device D does not emit light, the pulse signal C is set according to the spectrum of the luminance waveform of one frame period. In this way, light-emitting luminance of the time period corresponding to the pulse signal could be reduced, thereby the low-frequency component in the luminance spectrum of a frame period could be reduced and the flicker issue is alleviated.

Figure 6:
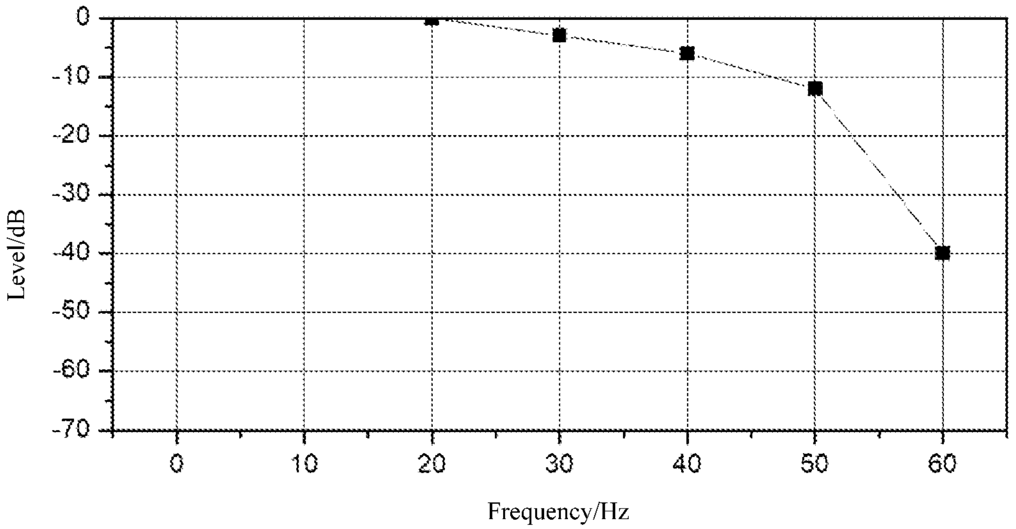
FIG. 6 is a frequency characteristic diagram of the integrator for processing a luminance signal according to an embodiment of the present disclosure.

Please refer to FIG. 6. FIG. 6 is a frequency characteristic diagram of the integrator for processing a luminance signal according to an embodiment of the present disclosure. The abscissa is the frequency in Hertz (Hz). The ordinate is the level (Level), and the unit dB is a numerical value without any unit labeling.

The frequency characteristics of the integrator are the same as the response characteristics of human vision to different frequencies. When the frequency is 60 Hz or less, the level increases sharply. That is, in a frame period, the luminance changes with time. The frequency components of the frequency-domain signal can be obtained by performing a Fourier transform on the time-domain signal of the luminance. Human eyes have different sensitivity values for different frequency components. For example, within the frequencies below 60 Hz, under the condition that the luminance remains the same, the higher the frequency, the fewer flickers and less sensitive the human eye feels. That is, the human eye is more sensitive to flickers at frequencies below 60 Hz in the luminance spectrum. When the display panel is at a low refresh rate (such as <60 Hz), when the luminance in one frame period has a large drop or increase, then the luminance spectrum has a large amplitude component at a low frequency (such as <60 Hz), and the flicker value will be higher. Accordingly, the human eye will also notice the flicker.

In the periodic continuous luminance waveform, the position with high luminance corresponds to the peak phase of the low frequency component. In order to further eliminate the low frequency component in the luminance spectrum, in some embodiments of the present disclosure, the pulse signal C is correspondingly set according to the low frequency component in the luminance spectrum in one frame period, where the low frequency component is located at a frequency lower than 60 Hz. Since the light-emitting control transistor T0 is turned off under the control of the pulse signal C, the light-emitting device D does not emit light, so the light-emitting luminance of the time period corresponding to the pulse signal C can be reduced, thereby the low-frequency component in the luminance spectrum of one frame period could be reduced to improve the flicker appearance and flicker value.

In the actual implementation, the frequency range of the low frequency components can also be set according to the flicker specification requirements of the display panel and thus is not specifically limited in the present disclosure.

In addition, compared with the conventional LTPO (Low Temperature Polycrystalline Oxide) technology, which uses IGZO (Indium Gallium Zinc Oxide) transistors with a lower leakage current to solve the flicker issue under low frequency driving, an embodiment of the present disclosure may still only use LTPS transistors without using both LTPS transistors and IGZO transistors. Accordingly, the pixel circuit 10 has a simpler structure and manufacturing process such that the cost is effectively reduced.

The pixel circuit 10 may be the pixel circuit 10 shown in FIG. 1. However, the pixel circuit 10 shown in FIG. 1 is only an example, not a limitation of the present disclosure. For example, in this embodiment, each transistor is a P-type transistor, but each transistor may also be an N-type transistor, a dual-gate transistor, or the like. For another example, the pixel circuit 10 may further include other types of threshold voltage compensation structures or power supply voltage VDD compensation structures, etc., which are not limited in the present disclosure.

The light-emitting control module 10*b* may include the transistor T4 and/or the transistor T5 in FIG. 1 as long as the light emitting-control module 10*b* controls the light-emitting device D to emit light or not to emit light under the control of the light emitting-control signal EM. The light-emitting control signal EM may be obtained by superimposing the pulse signal C on the enable signal EM(n). The light-emitting control signal EM may also be obtained by superimposing the pulse signal C on the signals that could control the light-emitting device D to emit light.

Figure 7:
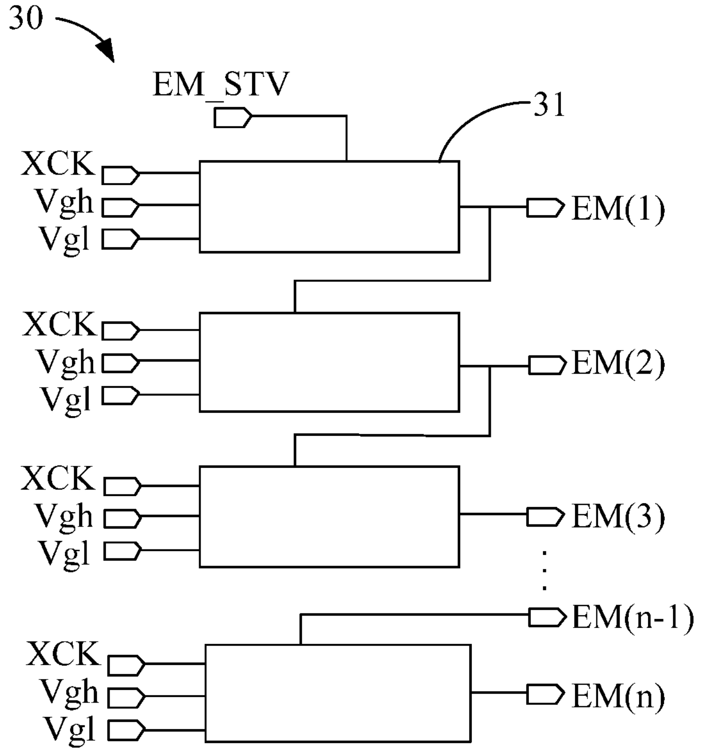
FIG. 7 is a diagram of a GOA circuit according to an embodiment of the present disclosure.

Please refer to FIG. 7. FIG. 7 is a diagram of a GOA circuit according to an embodiment of the present disclosure. The GOA circuit 30 includes multi-stage cascaded GOA cells 31. The GOA circuit 30 is configured to generate a multi-stage enable signal, such as the first-stage enable signal EM(1), the second-stage enable signal EM(2), the third-stage enable signal EM(3), the $(n-1)^{th}$-stage enable signal EM(n−1), the $n^{th}$ stage enable signal EM(n), etc., based on the clock signal XCK, the high voltage level signal Vgh and the low voltage level signal Vgl, and the start signal STV_EM.

The first reference pulse signal A and the second reference pulse signal B exist in the start signal STV_EM. The start signal STV_EM is transmitted through stages in the GOA circuit 30, and the enable signal EM(n) of each stage is outputted. The waveform of each stage enable signal EM(n) is the same as that of the start signal STV_EM, and there is a time offset. Therefore, the signal timing of the start signal STV_EM determines the timing of the enable signal EM(n). The pulse signal C can be added to the start signal STV_EM, so that the enable signal EM(n) outputted by the GOA circuit 30 also includes the pulse signal C. That is, the light-emitting control signal EM is formed.

Because the pulse signal C is used to add a non light-emitting time period in the original driving luminance waveform within one frame period, the pulse signal C could be provided by the GOA circuit 30 that generates the enable signal EM(n). Or, the pulse signal C could be generated by a set of GOA circuits or other GOA circuits that generate signals that can control the light-emitting state of the light-emitting device D. All these modifications fall within the scope of the present disclosure.

In the following embodiments, the light-emitting control transistor T0 is a P-type transistor, and the light-emitting control signal EM is obtained by superimposing the pulse signal C on the enable signal EM(n). However, this is merely an example, not a limitation of the present disclosure.

The light-emitting control signal EM also includes a first reference pulse signal A and a second reference pulse signal B. Here, the first reference pulse signal A is located at the beginning of a frame period. The second reference pulse signal B is on at least one time equal diversion point of a frame period, and there is a certain time interval between the second reference pulse signal B and the first reference pulse signal A. Here, the time-equivalent point refers to the point of bisection, the points of trisection, the points of quadrisection, the points of 32-section, and the like of a frame period.

The first reference pulse signal A and the second reference pulse signal B constitute the enable signal EM(n). In one frame period and in the active time period of the first reference pulse signal A, the pixel circuit 10 is in the reset phase t1 and the data writing and compensation phase t2 to perform the reset and compensation charging. At this time, the first reference pulse signal A is a high voltage level pulse, the light-emitting control transistor T0 is turned off, and the light-emitting device D does not emit light. In the light-emitting period t3 of the frame period, the enable signal EM(n) is kept at a low voltage level, and the light-emitting device D emits light. However, due to the addition of the second reference pulse signal B of a high voltage level, the light emitting device D does not emit light during the application period of the second reference pulse signal B. The second reference pulse signal B is used to adjust the luminance of the display by PWM (Pulse Width Modulation, pulse width modulation) technology.

Generally, the same first reference pulse signal A and the same second reference pulse signal B are generally used in the display panels of the same model. However, since the time luminance waveform of each display panel is different, the pulse signal C can be independently adjusted for each display panel to achieve the best effect of reducing flicker. That is, the pixel circuit 10 may be used in a plurality of display panels, and the light-emitting control signal EM may have a corresponding set of pulse signals C in each display panel.

In the periodic continuous luminance waveform, the position with high luminance corresponds to the peak phase of the low frequency component. Therefore, more pulse signals C can be set in the period of higher luminance in each frame period. For example, for a luminance waveform whose luminance gradually decreases within a frame period, the pulse signal C is more concentrated at the earlier time within the frame period. For a luminance waveform whose luminance gradually rises in a frame period, the pulse signal C is more concentrated at a later time in the frame. For arbitrarily shaped luminance waveforms, the pulse signal C is more concentrated near the maximum value of the luminance waveform.

Specifically, according to the luminance distribution of a frame period, the frame period is set to include the first display stage and the second display stage. The display luminance of the first display stage is greater than the display luminance of the second display stage. In this case, the distribution density of the pulse signal C in the first display stage is set to be greater than the distribution density of the pulse signal C in the second display stage. From the above, the setting steps of the pulse C can be simplified. Of course, multiple display stages may be set according to the actual luminance distribution. All these modifications fall within the scope of the present disclosure.

The pixel circuit 10 can operate in multiple driving modes. Each driving mode corresponds to a refresh rate. The refresh rate refers to the number of times the screen is refreshed per second. That is, the refresh rate is the frame cycles per second. Under different refresh frequencies, the light-emitting control signal EM may include a group of pulse signals C with different positions, pulse widths and numbers. Here, the term “plurality” refers to two or more.

Specifically, the pixel circuit 10 can work in the first driving mode or the second driving mode. The refresh frequency of the first driving mode is lower than the refresh frequency of the second driving mode. Here, in one frame period, the number of pulse signals C in the first driving mode is greater than or equal to the number of pulse signals C in the second driving mode.

Since the refresh frequency of the first driving mode is lower than the refresh frequency of the second driving mode, the duration of the light-emitting phase t3 of one frame period in the first driving mode is longer than the duration in the second driving mode. The longer the light-emitting time, the greater the variation of the light-emitting luminance may be due to leakage and other reasons, and the greater the possibility of flickering. Therefore, by setting the number of pulse signals C in the first driving mode to be greater than or equal to the number of pulse signals C in the second driving mode, different pulse signals C can be set in the light-emitting control signal EM in different driving modes, so as to better improve the flicker issue.

For example, when the refresh frequency is 10 Hz, the number of pulse signals C in one frame period is not less than 10. When the refresh frequency is 15 Hz, the number of pulse signals C in one frame period is not less than five. When the refresh frequency is 20 Hz, the number of pulse signals C in one frame period is not less than five. When the refresh frequency is 30 Hz, the number of pulse signals C in one frame period is not less than one. All other modifications of this embodiment will not be listed here for simplicity.

In this embodiment, under any refresh frequency, the number of pulse signals C may be one or more. In one frame period, the start time and the end time of each pulse signal C can appear at any position in one frame period.

Specifically, the pulse signal C may at least partially overlap with the first reference pulse signal A or at least partially overlap with the second reference pulse B. Alternatively, the pulse signal C is provided with a time interval with the first reference pulse signal A and the second reference pulse signal. When the pulse signal C overlaps with the first reference pulse signal A or the second reference pulse B, it does not affect the function of the pulse signal C to reduce the low-frequency components.

In an embodiment, the position, pulse width and pulse number of the pulse signal C in the light-emitting control signal EM are determined by the original driving luminance waveform. The original driving luminance waveform refers to the luminance waveform driven by the enable signal EM(n) without the pulse signal C. Specifically, the low-frequency components in the luminance spectrum obtained by performing the Fourier transform on the original driving luminance waveform determines the position, pulse width and pulse number of the pulse signal C in the light-emitting control signal EM.

After the pulse signal C is introduced into the light-emitting control signal EM, compared with the original driving luminance waveform, under the effect of the pulse signal C, a new luminance variance, which is the luminance waveform increment, will be introduced. Here, the low-frequency components in the spectrum of the original driving luminance waveform and the low-frequency components in the spectrum of the luminance increment introduced by the pulse signal C are as equal as possible in amplitude and opposite in phase at the same frequency. In this way, the amplitudes of the low-frequency components in the spectrum of the original driving luminance waveform can be eliminated or reduced, thereby reducing the flicker value and reducing the human eye flicker feeling.

Specifically, the obtaining method of the position, pulse width and quantity of the pulse signal C may include the following steps:

Step 101: Measuring and obtaining the original driving luminance waveform under the driving of the enable signal EM.

Specifically, a luminance measuring instrument, such as a luminance meter, can be used to detect the luminance in a frame period to obtain a luminance signal, and the luminance signal is converted into a digital signal to obtain the original driving luminance waveform.

Step 102: performing Fourier transform on the original driving luminance waveform to obtain the amplitude and phase of each low-frequency component.

Here, the principle and process of performing Fourier transform on the original driving luminance waveform are well known to those skilled in the art, and thus further illustration is omitted here. The luminance spectrum of the original driving luminance waveform can be obtained by Fourier transform. The luminance spectrum includes frequency-domain amplitude information and frequency-domain phase information. Thus, the amplitude and phase of each low-frequency (<60 Hz) component in the luminance spectrum of the original driving luminance waveform can be obtained.

Step 103: matching the negative value increments of the luminance waveform with equal amplitudes and opposite phases according to the amplitude and phase of each low-frequency component.

Specifically, according to the amplitude and phase of each low-frequency component, the negative value increments of the luminance waveform with equal amplitude and opposite phase can be respectively matched. It is also possible to take some low-frequency components, and then, according to the amplitude and phase of each low-frequency component, respectively match the negative value increments of the luminance waveform with equal amplitudes and opposite phases.

Step 104: superimposing the position, width and quantity of the negative value increment of the luminance waveform on the enable signal EM(n) or other signals that can control the light-emitting device D to emit light, thereby obtaining the pulse signal C and the light-emitting control signal EM.

Due to the effect of the pulse signal C, the light-emitting device D does not emit light. Therefore, the position, pulse width and quantity of the pulse signal C can be determined according to the position, width and quantity of the negative value increment of the luminance waveform and then superimposed on the enable signal EM(n) or other signals that can control the light-emitting device D to emit light. In this way, the light-emitting control signal EM can be obtained.

In the following embodiment, a 30 Hz refresh rate is taken as an example for illustration.

Figure 8:
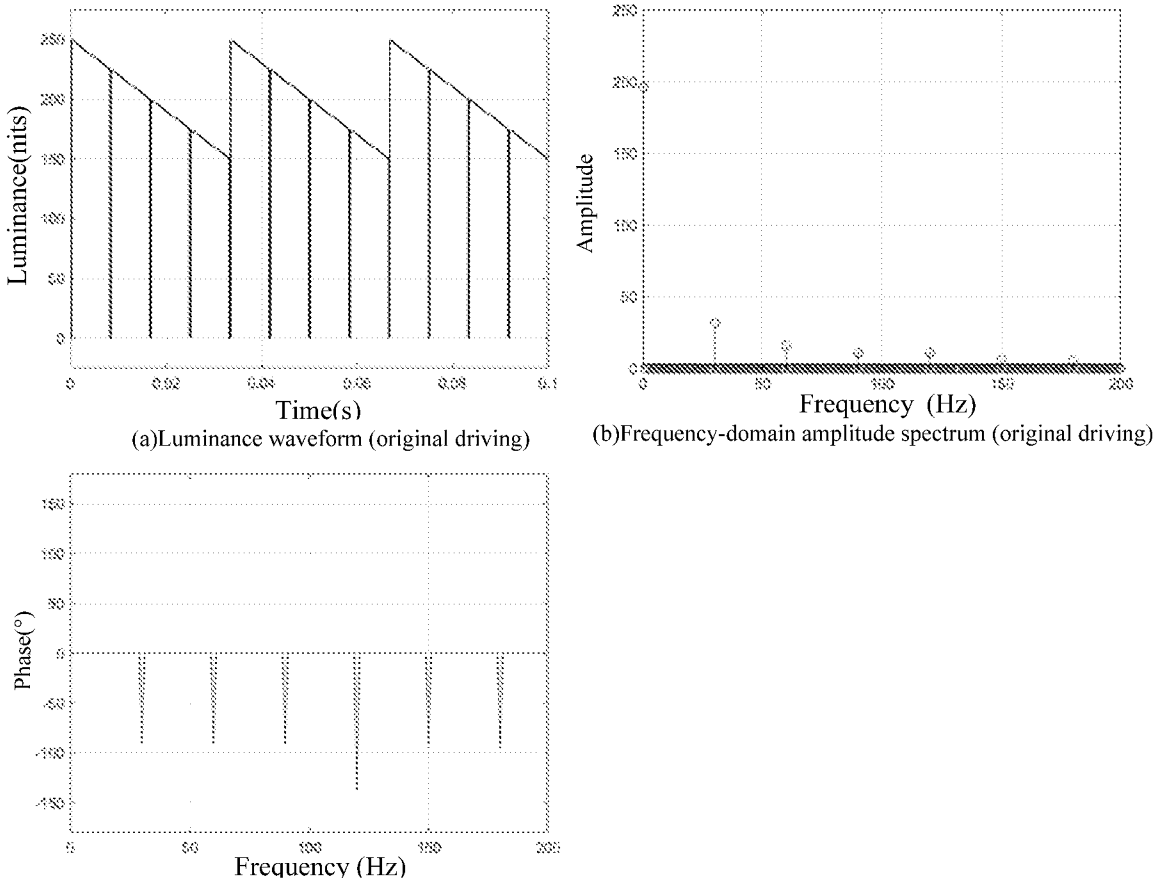
FIG. 8 is a diagram of an original driving luminance waveform and its luminance spectrum under a 30 Hz refresh frequency according to an embodiment of the present disclosure.
Figure 9:
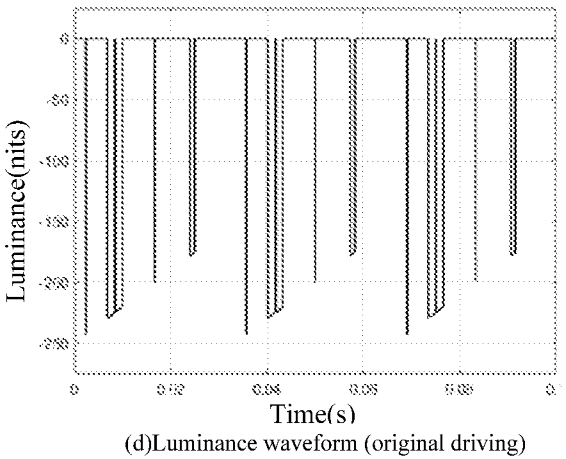
FIG. 9 is a diagram of the luminance waveform increment and its luminance spectrum caused by the pulse signal under a 30 Hz refresh frequency according to an embodiment of the present disclosure.
Figure 9:
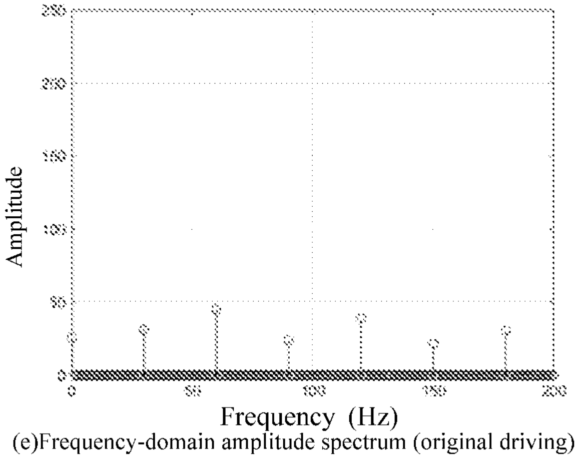
Figure 9:
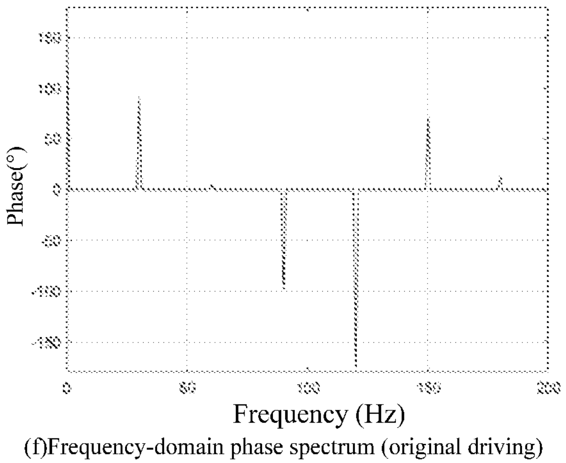
Figure 10:
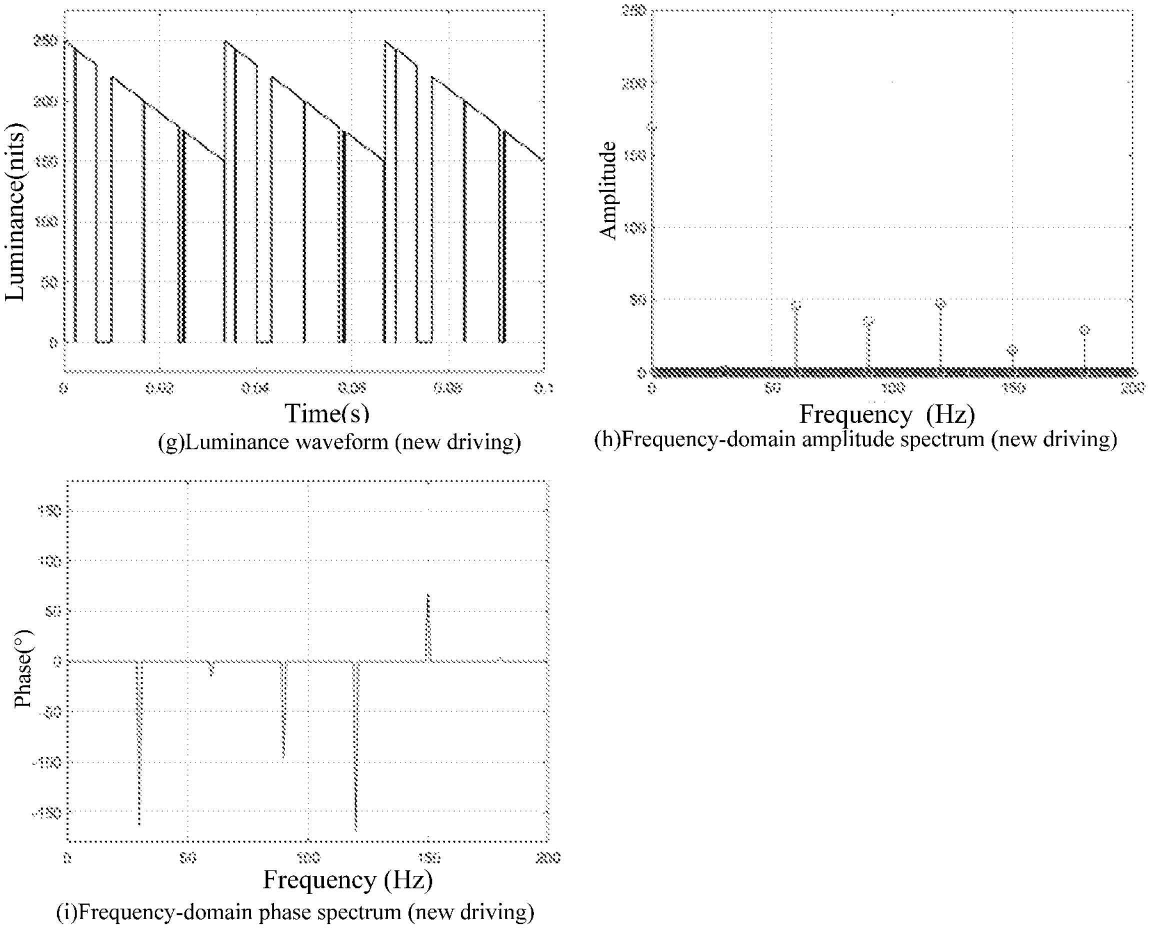
FIG. 10 is a diagram of a new driving luminance waveform and its luminance spectrum under a 30 Hz refresh frequency according to an embodiment of the present disclosure.

Please refer to FIGS. 8-10. FIG. 8 is a diagram of an original driving luminance waveform and its luminance spectrum under a 30 Hz refresh frequency according to an embodiment of the present disclosure. FIG. 9 is a diagram of the luminance waveform increment and its luminance spectrum caused by the pulse signal under a 30 Hz refresh frequency according to an embodiment of the present disclosure. FIG. 10 is a diagram of a new driving luminance waveform and its luminance spectrum under a 30 Hz refresh frequency according to an embodiment of the present disclosure.

FIG. 8(*a*) illustrates the original driving luminance waveform, FIG. 8(*b*) illustrates the frequency-domain amplitude spectrum of the original driving luminance waveform, and FIG. 8(*c*) illustrates is the frequency-domain phase spectrum of the original driving luminance waveform. FIG. 9(*d*) illustrates the luminance waveform increment introduced by the pulse signal C, FIG. 9(*e*) illustrates the frequency-domain amplitude spectrum of the luminance waveform increment, and FIG. 9(*f*) illustrates is the frequency-domain phase spectrum of the luminance waveform increment. FIG. 10(*g*) illustrates the new driving luminance waveform, which is the luminance waveform obtained by superimposing the pulse signal C on the original driving luminance waveform. FIG. 10(*h*) illustrates the frequency-domain amplitude spectrum of the new driving luminance waveform. FIG. 10(*i*) illustrates the frequency-domain phase spectrum of the new driving luminance waveform.

As shown in FIGS. 8(*b*) and 8(*c*), at a 30 Hz refresh frequency, the original driving luminance waveform has a frequency component at 30 Hz with an amplitude of 31.29 and a phase of −90.45°. In this regard, the number of pulse signals C to be added is 4 as shown in combination with FIGS. 8(*a*) and 9(*d*). The position and pulse width of each pulse signal C can be seen in FIG. 9(*d*). As shown in FIGS. 9(*e*) and 9(*f*), the luminance waveform increment has a frequency component at 30 Hz with an amplitude of 31.18 and a phase of 90.49°.

It can be seen that the amplitude of the low-frequency component of the luminance waveform increment introduced by the pulse signal C is approximately equal to the amplitude of the low-frequency component of the original driving luminance waveform, and the phases of them are approximately opposite. The original luminance waveform and the luminance waveform increment are superimposed, and the frequency component at 30 Hz of the obtained new driving luminance waveform has an amplitude of 0.52. The amplitude of the 30 Hz frequency component in the frequency domain is reduced to 1/60 of the original. Therefore, the setting of the pulse signal C can eliminate or reduce the amplitude of the low-frequency component of the original driving luminance waveform, thereby reducing the flickering perception of the human eye and reducing the flicker value.

Although the amplitude at 60 Hz frequency changes from 15.91 to 31.84, it can be seen from the above analysis that the human eye is extremely insensitive to flicker at the 60 Hz frequency. Therefore, the setting of the pulse signal C could greatly improve the flicker issue.

The original Flicker JEITA value calculated by the JEITA method is −21.9 dB, and the new Flicker JEITA value becomes −56.72 dB. It can be seen that the flicker issue has been well improved. The JEITA method calculates the Flicker value according to the amplitudes of different frequency signals, which is more in line with the human eye's perception of different flicker frequencies, and the measurement results are more objective and stable.

In the following embodiment, a 10 Hz refresh rate is taken as an example for illustration.

Figure 11:
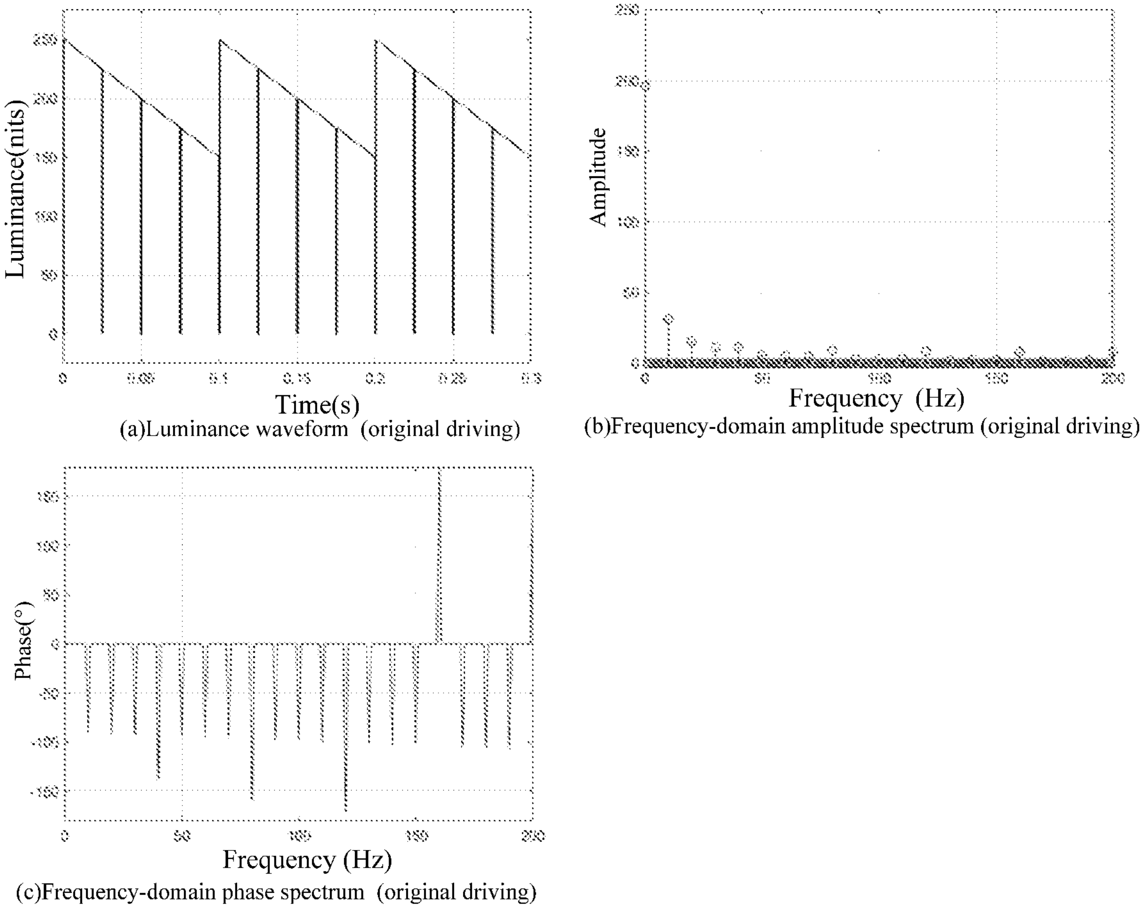
FIG. 11 is a diagram of an original driving luminance waveform and its luminance spectrum under a 10 Hz refresh frequency according to an embodiment of the present disclosure.
Figure 12:
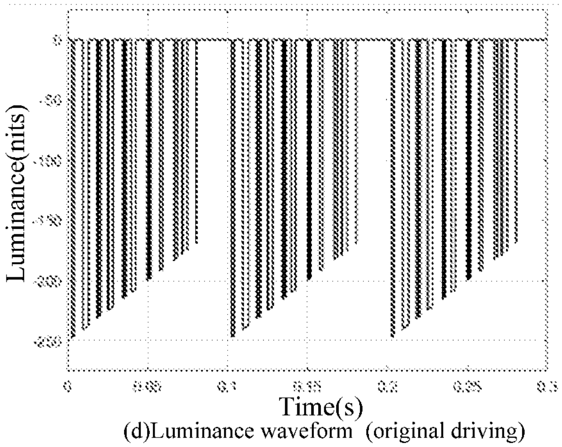
FIG. 12 is a diagram of the luminance waveform increment and its luminance spectrum caused by the pulse signal under a 10 Hz refresh frequency according to an embodiment of the present disclosure.
Figure 12:
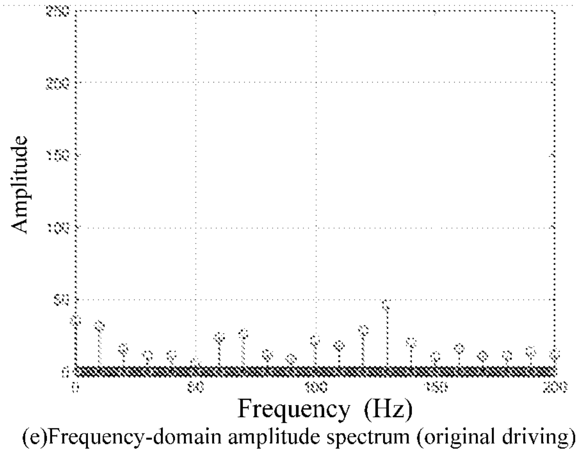
Figure 12:
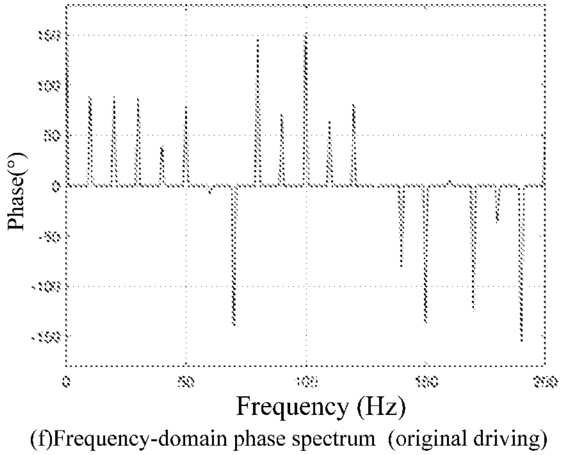
Figure 13:
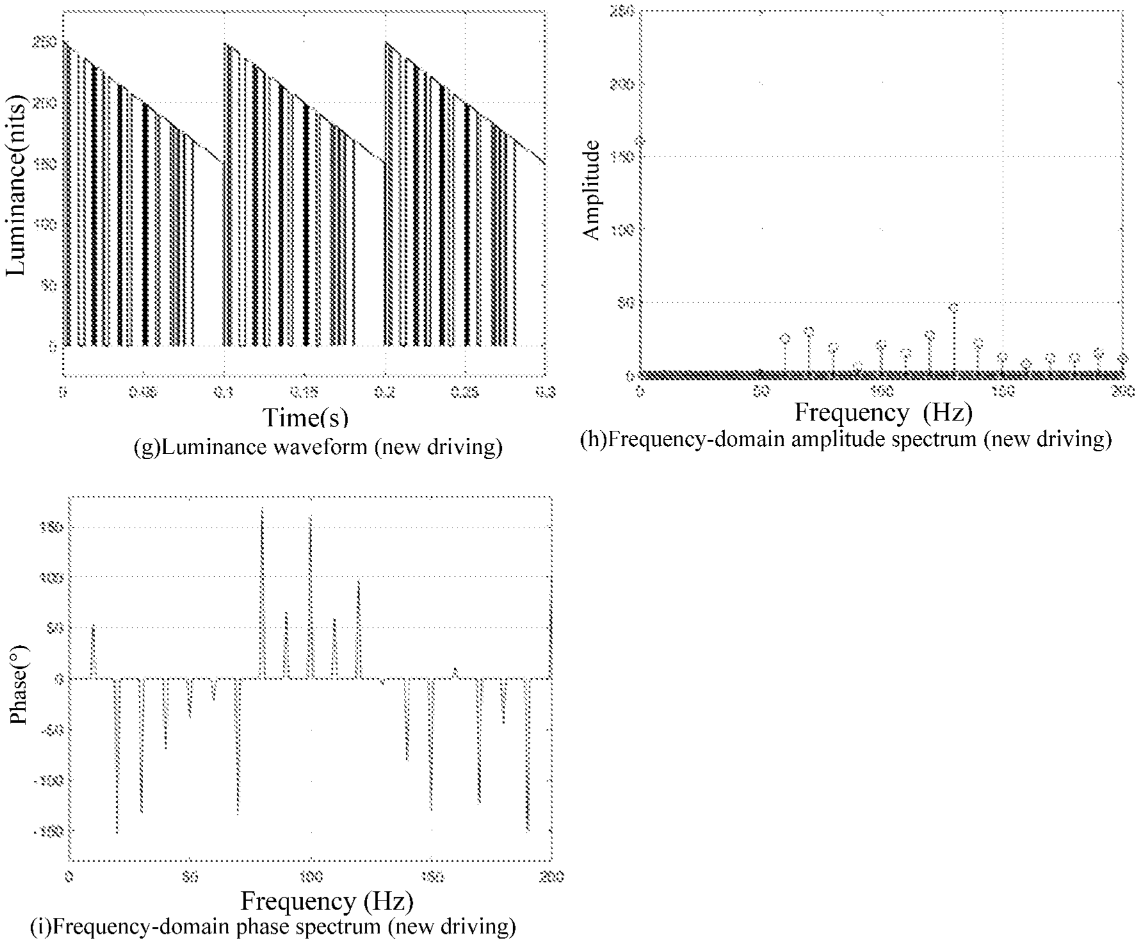
FIG. 13 is a diagram of a new driving luminance waveform and its luminance spectrum under a 10 Hz refresh frequency according to an embodiment of the present disclosure.

Please refer to FIGS. 11-13. FIG. 11(*a*)-11(*c*) illustrate diagrams of an original driving luminance waveform and its luminance spectrum under a 10 Hz refresh frequency according to an embodiment of the present disclosure. FIG. 12(*d*)-12(*f*) illustrate diagrams diagram of the luminance waveform increment and its luminance spectrum caused by the pulse signal under a 10 Hz refresh frequency according to an embodiment of the present disclosure. FIG. 13(*g*)-13(*i*) illustrate diagrams diagram of a new driving luminance waveform and its luminance spectrum under a 10 Hz refresh frequency according to an embodiment of the present disclosure.

FIG. 11(*a*) illustrates the original driving luminance waveform, FIG. 11(*b*) illustrates the frequency-domain amplitude spectrum of the original driving luminance waveform, and FIG. 11(*c*) illustrates the frequency-domain phase spectrum of the original driving luminance waveform. FIG. 12(*d*) illustrates the luminance waveform increment introduced by the pulse signal C, FIG. 12(*e*) illustrates the frequency-domain amplitude spectrum of the luminance waveform increment, and FIG. 12(*f*) illustrates the frequency-domain phase spectrum of the luminance waveform increment. FIG. 13(*g*) illustrates the new driving luminance waveform, which is the luminance waveform obtained by superimposing the pulse signal C on the original driving luminance waveform, FIG. 13(*h*) illustrates the frequency-domain amplitude spectrum of the new driving luminance waveform, FIG. 13(*i*) illustrates the frequency-domain phase spectrum of the new driving luminance waveform.

As shown in FIGS. 11(*b*) and 11(*c*), under the 10 Hz refresh frequency, the amplitudes of the frequency components of the original drive luminance waveform at frequencies of 10 Hz, 20 Hz, 30 Hz, 40 Hz and 50 Hz are all larger, and the amplitudes are respectively 31.31, 15.91, 11.11, 11.41 and 5.83. In this regard, the number of additional pulse signals C is 20 as shown in combination with FIGS. 11(*a*) and 12(*d*). The position and pulse width of each pulse signal C can be seen in FIG. 12(*d*). As shown in FIGS. 12(*e*) and 12(*f*), after the original luminance waveform and the luminance waveform increment are superimposed, the amplitudes of the frequency components of the new driving luminance waveform at frequencies of 10 Hz, 20 Hz, 30 Hz, 40 Hz and 50 Hz are all small, and the amplitudes are respectively 1.35, 1.06, 1.86, 0.99, and 1.32. The original Flicker JEITA value is −18.91 dB, and the new Flicker JEITA value is −44.75 dB. Therefore, the setting of the pulse signal C can eliminate or reduce the amplitude of the low-frequency component of the original driving luminance waveform, thereby reducing the flickering perception of the human eye and reducing the flicker value.

Figure 14:
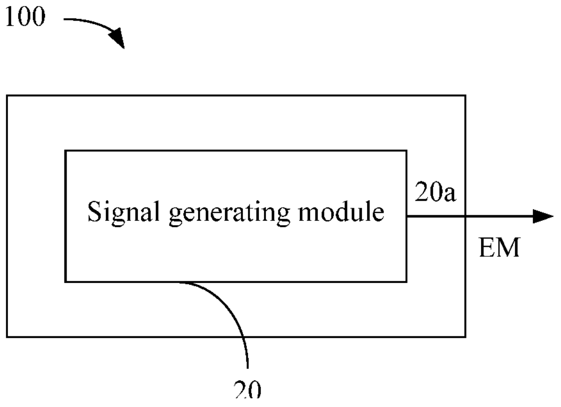
FIG. 14 is a diagram of a driving system according to a first embodiment of the present disclosure.

Please refer to FIG. 14. FIG. 14 is a diagram of a driving system according to a first embodiment of the present disclosure. The driving system 100 includes a signal generating module 20. The signal generating module 20 has an output end 20*a*. The output end 20*a* is used to output the light-emitting control signal EM in the pixel circuit 10 described in any of the above embodiments.

Figure 15:
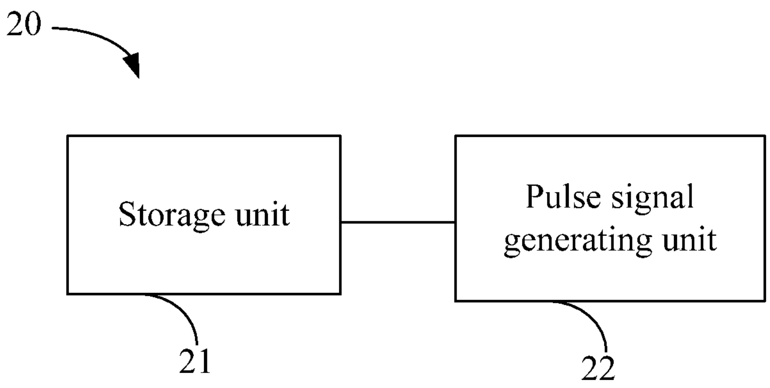
FIG. 15 is a diagram of the signal generating module according to an embodiment of the present disclosure.

Please refer to FIG. 15. FIG. 15 is a diagram of the signal generating module according to an embodiment of the present disclosure. The signal generating module 20 includes a storage unit 21 and a pulse signal generating unit 22.

The storage unit 21 is used to store the parameter information of the pulse signal C. The pulse signal generating unit 22 is connected to the storage unit 21 to acquire parameter information of the pulse signal C. The pulse signal generating unit 22 is used to generate the pulse signal C according to the parameter information.

The storage unit 21 may be a Mobile Industry Processor Interface (MIPI) register, a Read-Only Memory (ROM) or an external Flash chip (Flash IC).

The parameter information can be obtained according to the acquisition method of the position, pulse width and quantity of the pulse signal C in the aforementioned embodiment, and details are omitted her for simplicity. The parameter information can be stored in the storage unit 21 by means of One Time Programmable (OTP) programming or Flash programming during the manufacturing process of the display device.

The storage unit 21 can store a plurality of sets of parameter information, and each set of parameter information corresponds to a refresh frequency. The pulse signal generating unit 22 obtains corresponding parameter information according to different refresh frequencies.

The driving system 100 may include a plurality of driving modes. Each of the driving modes corresponds to a different refresh frequency. It can be understood from the aforementioned embodiments that, under different refresh frequencies, the positions, pulse widths and numbers of the pulse signals C included in the light-emitting control signal EM may be different. Therefore, in this embodiment, multiple sets of parameter information are stored in the storage unit 21. When the driving system 100 adopts different refresh frequencies, the pulse signal generating unit 22 can obtain corresponding parameter information and generate the corresponding pulse signal C such that the switching efficiency of the driving system 100 between different refresh frequencies could be improved.

The parameter information of the pulse signal C may include a pulse start position control parameter, a pulse step size type control parameter, a pulse start position parameter, and a pulse end position parameter.

The pulse start position control parameter is used to control the start position reference point of the pulse signal C. The reference point can be a frame synchronization signal or a frame blanking signal and can be defined by one data bit.

The pulse step type control parameter can be understood as a counting unit. For example, the pulse step type can be a line synchronization duration or a high-level pulse of a clock signal. The pulse step type can be defined by a data bit. For example, the counter can be incremented by one every time when the rising edge of the clock signal comes.

The pulse start position parameter refers to the rising edge position or falling edge position of the pulse signal C. In the embodiment, all the transistors are P-type transistors. Therefore, the pulse start position parameter refers to the position of the rising edge of the pulse signal C.

For example, the light-emitting control signal EM may include N pulse signals C, where N is an integer greater than or equal to 1. Each pulse signal C has a pulse start position parameter. For example, the start position parameter of the pulse i describes the start time position of the $i^{th}$ pulse signal C, and each parameter has a fixed data bit length. Here, i is an integer greater than or equal to 1 and less than or equal to N. For example, when the bit length is 24, the time range that can be represented is 0-16777215. The unit of each number is determined by the pulse step type control parameter.

The pulse start position parameter refers to the rising edge position or falling edge position of the pulse signal C. In the embodiment, all the transistors are P-type transistors. Therefore, the pulse end position parameter refers to the position of the falling edge of the pulse signal C.

For example, the light-emitting control signal EM may include N pulse signals C, where N is an integer greater than or equal to 1. Each pulse signal C has a pulse end position parameter. For example, the end position parameter of the pulse i describes the end time position of the $i^{th}$ pulse signal C, and each parameter has a fixed data bit length. Here, i is an integer greater than or equal to 1 and less than or equal to N. For example, when the bit length is 24, the time range that can be represented is 0-16777215. The unit of each number is determined by the pulse step type control parameter.

The pulse end position parameter and the pulse start position parameter work in pairs.

Figure 16:
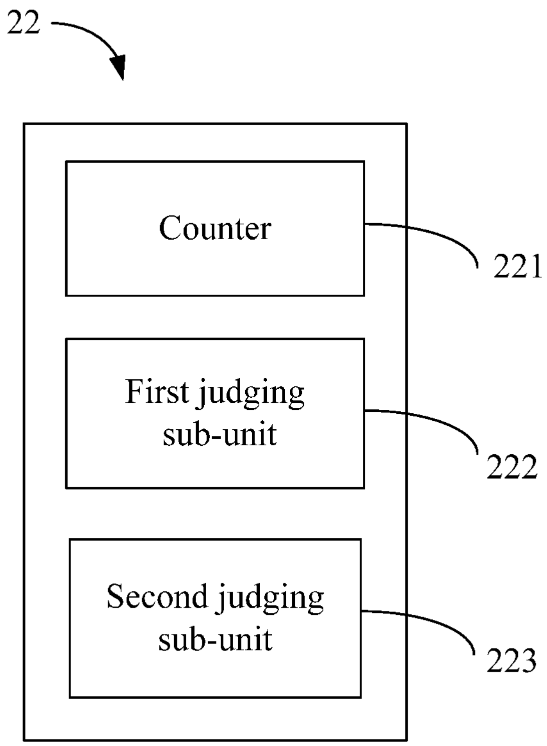
FIG. 16 is a pulse signal generating unit according to an embodiment of the present disclosure.

Please refer to FIG. 16. FIG. 16 is a pulse signal generating unit according to an embodiment of the present disclosure. In this embodiment of the present disclosure, the pulse signal generating unit 22 includes a counter 221, a first judging sub-unit 222 and a second judging sub-unit 223.

The counter 221 counts according to the pulse start position control parameter and the pulse step type control parameter to obtain the first parameter. The first judging sub-unit 222 compares the first parameter with the pulse start position parameter. When the first parameter is less than the pulse start position parameter, the counter 221 continues to count. When the first parameter is equal to the pulse starting position parameter, the start position of the pulse signal is determined. The second judging sub-unit 223 compares the first parameter with the pulse end position parameter. When the first parameter is less than the pulse end position parameter, the counter 221 continues to count. When the first parameter is equal to the pulse end position parameter, the end position of the pulse signal is determined.

Figure 17:
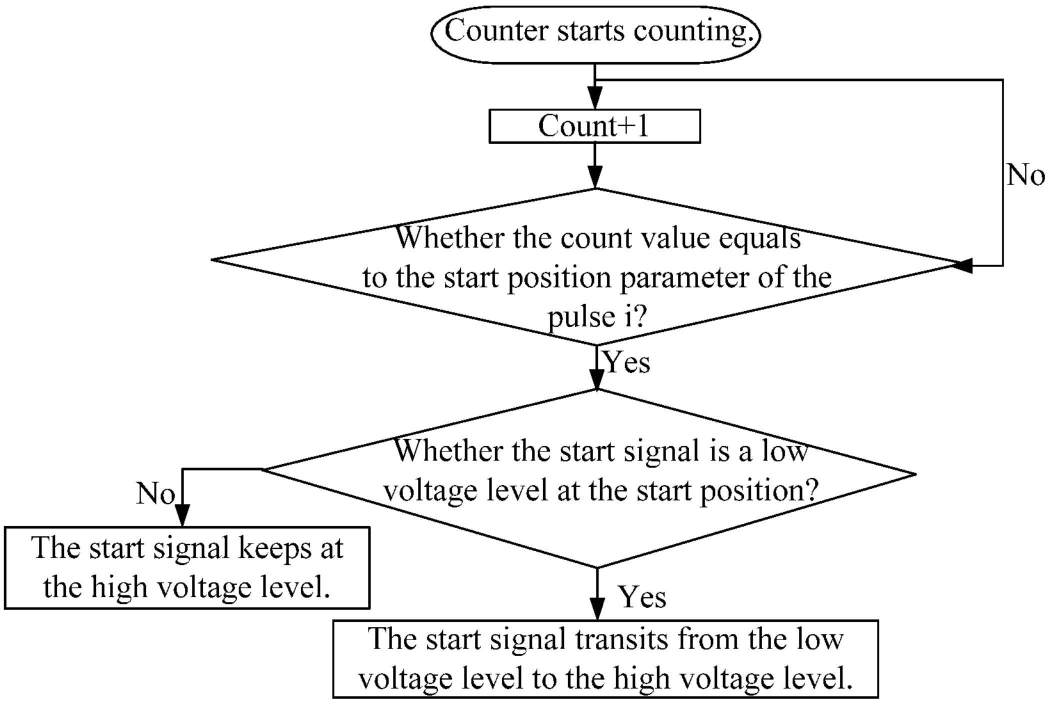
FIG. 17 is a flow chart for determining a pulse start position parameter according to an embodiment of the present disclosure.
Figure 18:
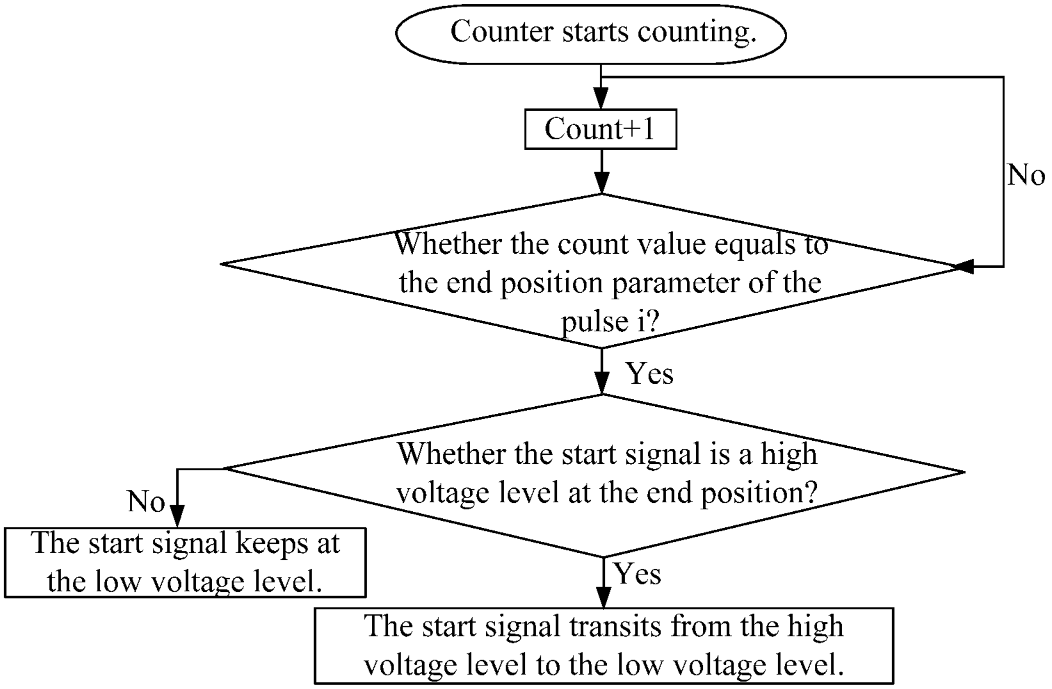
FIG. 18 is a flow chart for determining a pulse end position parameter according to an embodiment of the present disclosure.

Please refer to FIGS. 17-18. FIG. 17 is a flow chart for determining a pulse start position parameter according to an embodiment of the present disclosure. FIG. 18 is a flow chart for determining a pulse end position parameter according to an embodiment of the present disclosure.

As shown in FIG. 17, the counter 221 starts counting according to the pulse start position control parameter and continue counting according to the pulse step type control parameter. The first judging sub-unit 222 compares the count value with the start position parameter of the pulse i. When the count value is less than the start position parameter of the pulse i, the counter 221 continues counting and the count value adds by 1. When the count value is equal to the start position parameter of the pulse i, the start position of the pulse signal is determined. At this time, when the start signal STV_EM is a low voltage level at the start position, the start signal STV_EM transits from a low voltage level to a high voltage level. That is, the position of the rising edge of pulse i is determined. When the start signal STV_EM is at a high voltage level. For example, there is a second pulse signal B in the start signal STV_EM at this position, and the start signal STV_EM remains at a high voltage level.

As shown in FIG. 18, after determining the start position of pulse i, the counter 221 continues to count, and the second judging sub-unit 223 compares the count value with the pulse end position parameter. When the count value is less than the pulse end position parameter, the counter 221 continues to count. When the count value is equal to the pulse end position parameter, the end position of the pulse signal is determined. At this time, when the start signal STV_EM is at a high voltage level, the start signal STV_EM changes from a high voltage level to a low voltage level. That is, the position of the falling edge of pulse i is determined. When the start signal STV_EM is at a low voltage level, the start signal STV_EM remains at a low voltage level.

Figure 19:
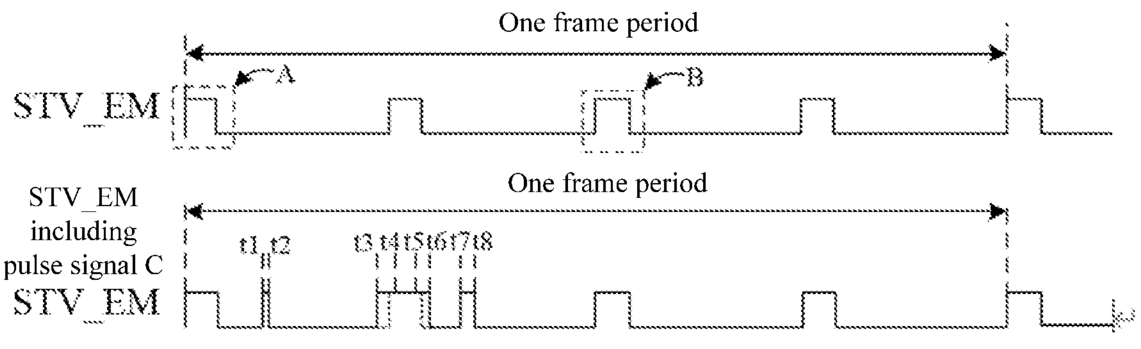
FIG. 19 is a timing diagram of a start signal and a start signal including a pulse signal according to an embodiment of the present disclosure.

Therefore, as shown in FIG. 19, a 30 Hz refresh frequency is taken as an example for the following illustration. After being processed by the pulse signal generating unit 22, the start signal STV_EM including the pulse signal C can be obtained compared to the start signal STV_EM. In one frame period, in the start signal STV_EM including the pulse signal C, the first pulse signal C is inserted in the time period t1-t2, the second pulse signal C is inserted in the time period t3-t4, the third pulse signal C is inserted in the time period t5-t6, and the fourth pulse signal C is inserted in the time period t7-t8. It can be seen that both the second pulse signal C and the third pulse signal C both partially overlap with the second reference pulse signal B.

Figure 20:
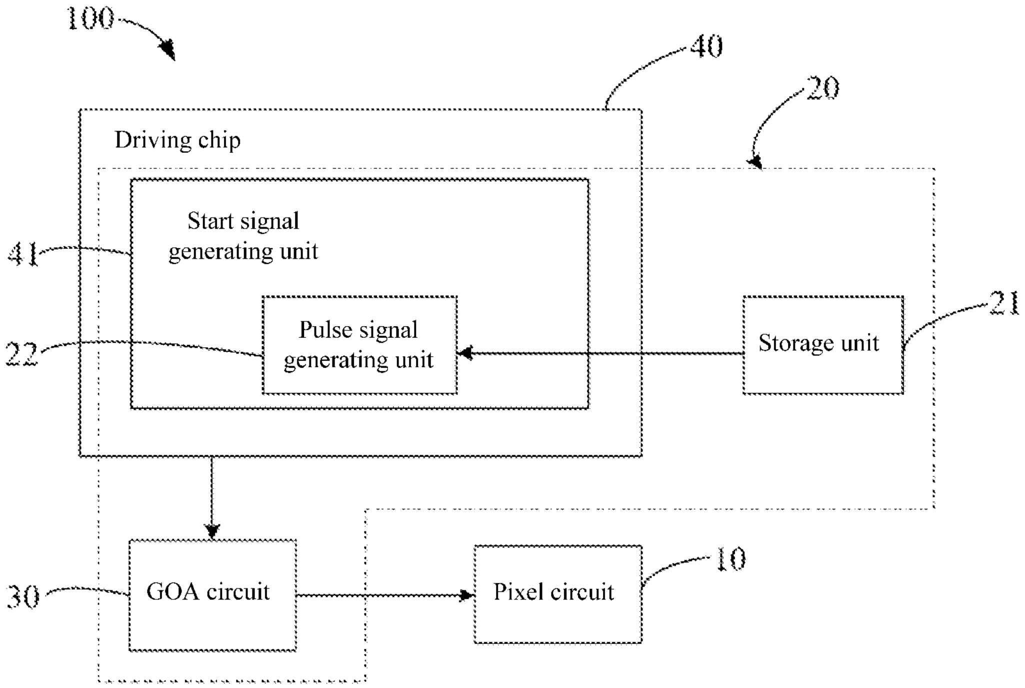
FIG. 20 is a diagram of a driving system according to a second embodiment of the present disclosure.

Please refer to FIG. 20. FIG. 20 is a diagram of a driving system according to a second embodiment of the present disclosure. The signal generating module 20 further includes a start signal generating unit 41 and a GOA circuit 30. The pulse signal generating unit 22 is placed in the start signal generating unit 41. The start signal generating unit 41 is used to generate the start signal STV_EM including the pulse signal C. The GOA circuit 30 is connected to the start signal generating unit 41. The GOA circuit 30 generates the multi-stage light-emitting control signal EM according to the start signal number STV_EM including the pulse signal C. The multi-stage light-emitting control signals EM are respectively transmitted to different pixel circuits 10.

The driving system 100 further includes a driving chip 40. The start signal generating unit 41 is placed in the driving chip 40. The driving chip 40 is a chip for driving the display panel to display an image. One of the functions of the driver chip 40 is to generate the start signal STV_EM. Then, the GOA circuit 30 generates a multi-stage enable signal EM(n) according to the start signal STV_EM.

According to an embodiment of the present disclosure, the pulse signal C is superimposed on the start signal STV_EM, and the start signal STV_EM including the pulse signal C can be obtained. Then, the GOA circuit 30 may generate the multi-stage light-emitting control signal EM according to the start signal STV_EM of the pulse signal C.

Figure 21:
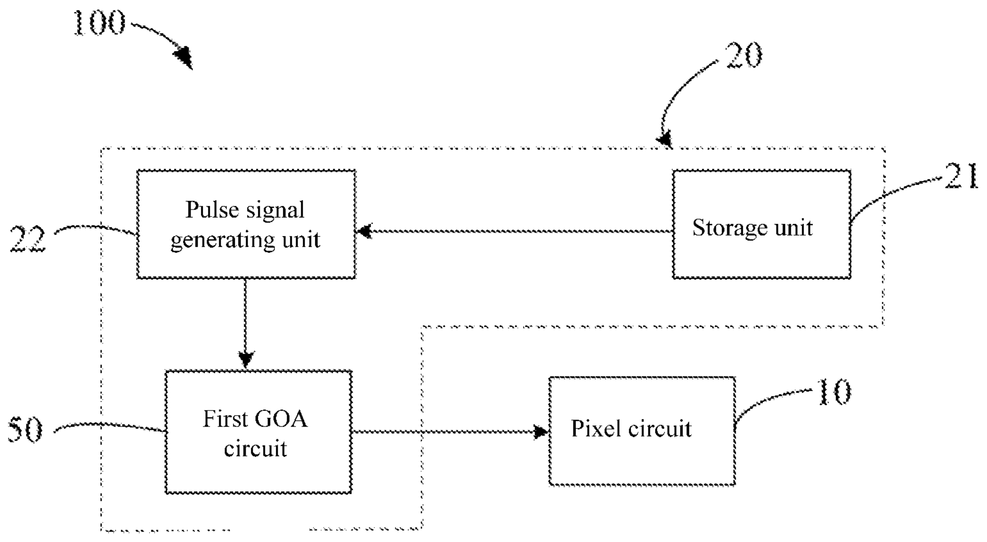
FIG. 21 is a diagram of a driving system according to a third embodiment of the present disclosure.

Please refer to FIG. 21. FIG. 21 is a diagram of a driving system according to a third embodiment of the present disclosure. In this embodiment, the signal generating module 20 includes a first GOA circuit 50. The first GOA circuit 50 is connected to the pulse signal generating unit 22. The first GOA circuit 50 is used to generate the multi-stage pulse signal C.

The first GOA circuit 50 and the GOA circuit 30 shown in FIG. 20 are independent. Since the function of the pulse signal C is to add a non-emitting time period to the original luminance waveform according to the position of the pulse signal C in one frame period, the pulse signal C can not only be provided by the GOA circuit 30, but also can be generated by a single set of GOA circuits 50.

According to an embodiment of the present disclosure, a single set of first GOA circuits 50 is used to generate a multi-stage pulse signal C. The light-emitting state of the light-emitting device D in the pixel circuit 10 can be directly controlled by the pulse signal C. Accordingly, it is possible to improve the control accuracy of the pulse signal C with respect to the light-emitting luminance of one frame period.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A pixel circuit, comprising:

a light-emitting device;

a driving module, connected to the light-emitting device to drive the light-emitting device to emit light; and a light-emitting control module, connected to the driving module, wherein the light-emitting control module, the light-emitting device and the driving module are all connected in series between a first power supply signal and a second power supply signal, and a control end of the light-emitting control module receives a light-emitting control signal;

wherein the light-emitting control signal includes at least one pulse signal, the light-emitting control module turns off the light-emitting device in response to the pulse signal, and the pulse signal is set according to a spectrum of a luminance waveform of a frame period.

2. The pixel circuit of claim 1, wherein the light-emitting control signal further comprises a first reference pulse signal and a second reference pulse signal, the first reference pulse signal is located at a beginning of a frame period, and the second reference pulse signal is on at least one time equal diversion point of a frame period;

wherein a time interval exists between any two of the pulse signal, the first reference pulse signal and the second reference pulse signal, or the pulse signal and the first reference pulse signal or the second reference pulse signals are partially overlapped.

3. The pixel circuit of claim 1, wherein the pixel circuit operates in one of a plurality of driving modes, and a refresh frequency of each driving mode is different, and the light-emitting control signal under each driving mode has a corresponding set of pulse signals.

4. The pixel circuit of claim 3, wherein the pixel circuit operates in at least a first driving mode or a second driving mode, a refresh frequency of the first driving mode is less than a refresh frequency of the second driving mode;

wherein, in one frame period, a number of pulses of the pulse signal in the first driving mode is greater than or equal to a number of pulses of the pulse signal in the second driving mode.

5. The pixel circuit of claim 3, wherein in one frame period, when the refresh frequency is 15 Hz, a number of the pulse signals is not less than 5; when the refresh frequency is 20 Hz, a number of the pulse signals is not less than 5; and when the refresh frequency is 30 Hz, the number of the pulse signals is not less than 1.

6. The pixel circuit of claim 1, wherein the pulse signal is set according to a low frequency component in the spectrum of the luminance waveform of the frame period; and a frequency of the low frequency component is less than 60 Hz.

7. The pixel circuit of claim 1, wherein the frame period includes a first display stage and a second display stage; a display luminance of the first display stage is greater than a display luminance of the second display stage; and a distribution density of the pulse signal in the first display stage is greater than distribution density of the pulse signal in the second display stage.

8. A driving system, comprising: a signal generating module having an output terminal, configured to output the light-emitting control signal in the pixel circuit of claim 1, a signal generating module having an output terminal, configured to output a light-emitting control signal;

a pixel circuit, comprising:

a light-emitting device;

a driving module, connected to the light-emitting device to drive the light-emitting device to emit light; and a light-emitting control module, connected to the driving module, wherein the light-emitting control module, the light-emitting device and the driving module are all connected in series between a first power supply signal and a second power supply signal, and a control end of the light-emitting control module receives the light-emitting control signal;

wherein the light-emitting control signal includes at least one pulse signal, the light-emitting control module turns off the light-emitting device in response to the pulse signal, and the pulse signal is set according to a spectrum of a luminance waveform of a frame period.

9. The driving system of claim 8, wherein the signal generating module comprises a storage unit and a pulse signal generating unit;

wherein the storage unit is configured to store parameter information of the pulse signal; the pulse signal generating unit is connected to the storage unit, and the pulse signal generation unit is configured to generate the pulse signal according to the parameter information.

10. The driving system of claim 9, wherein the storage unit stores a plurality of sets of the parameter information, each set of the parameter information corresponds to a refresh frequency, and the pulse signal generating unit correspondingly obtains the parameter information according to different refresh frequencies.

11. The driving system of claim 9, wherein the signal generation module further comprises a start signal generating unit and a GOA circuit; the pulse signal generation unit is arranged in the start signal generation unit; the start signal generating unit is configured to generate a start signal including the pulse signal; the GOA circuit is connected to the start signal generating unit; and the GOA circuit is configured to generate multiple stages of the light-emitting control signal according to the start signal including the pulse signal.

12. The driving system of claim 11, wherein the driving system further comprises a driving chip, and the start signal generating unit is provided in the driving chip.

13. The driving system of claim 9, wherein the signal generating module further comprises a first GOA circuit; the first GOA circuit is connected with the pulse signal generating unit; and the first GOA circuit is configured to generate multiple stages of the pulse signal.

14. The driving system of claim 8, wherein the parameter information includes a pulse start position control parameter, a pulse step size type control parameter, a pulse start position parameter, and a pulse end position parameter.

15. The driving system of claim 14, wherein the pulse signal generating unit comprises a counter, a first judging sub-unit and a second judging sub-unit;

wherein, the counter is configured to count according to the pulse start position control parameter and the pulse step size type control parameter to obtain a first parameter; the first judging sub-unit compares the first parameter with the pulse start position parameter; when the first parameter is less than the pulse start position parameter, the counter continues to count; when the first parameter is equal to the pulse start position parameter, then a start position of the pulse signal is determined; the second judging sub-unit compares the first parameter with the pulse end position parameter; when the first parameter is less than the pulse end position parameter, the counter continues to count; and when the first parameter is equal to the pulse end position parameter, then the end position of the pulse signal is determined.

16. The driving system of claim 8, wherein the pulse signal is set according to a low frequency component in the spectrum of the luminance waveform of the frame period; and a frequency of the low frequency component is less than 60 Hz.

17. The driving system of claim 8, wherein the light-emitting control signal further comprises a first reference pulse signal and a second reference pulse signal, the first reference pulse signal is located at a beginning of a frame period; and the second reference pulse signal is on at least one time equal diversion point of a frame period;

wherein a time interval exists between any two of the pulse signal, the first reference pulse signal and the second reference pulse signal, or the pulse signal and the first reference pulse signal or the second reference pulse signals are partially overlapped.

18. The driving system of claim 8, wherein the pixel circuit operates in one of a plurality of driving modes, and a refresh frequency of each driving mode is different, and the light-emitting control signal under each driving mode has a corresponding set of pulse signals.

19. The driving system of claim 8, wherein the frame period includes a first display stage and a second display stage; a display luminance of the first display stage is greater than a display luminance of the second display stage; and a distribution density of the pulse signal in the first display stage is greater than distribution density of the pulse signal in the second display stage.

* * * * *